May 9, 1967 S. R. GENSON 3,318,541
METHOD AND APPARATUS FOR WINDING CONTINUOUS STRAND
Filed Feb. 9, 1965 6 Sheets-Sheet 4

INVENTOR.
SAMUEL RICHARD GENSON
BY
ATTORNEY

United States Patent Office 3,318,541
Patented May 9, 1967

3,318,541
METHOD AND APPARATUS FOR WINDING CONTINUOUS STRAND
Samuel R. Genson, Bowling Green, Ohio, assignor to Johns-Manville Corporation, New York, N.Y., a corporation of New York
Filed Feb. 9, 1965, Ser. No. 436,985
9 Claims. (Cl. 242—18)

This is a continuation-in-part of application Ser. No. 237,895, filed Nov. 15, 1962, now abandoned.

This invention relates to the production of continuous filamentary materials. More particularly, it relates to method and apparatus for winding a continuously advancing strand of filamentary material such as glass or other heat-softenable fibers during the continuous manufacture thereof.

Continuous glass filaments are commonly produced by exuding a plurality of streams of molten glass through the base of a melting receptacle and attenuating the exudations by mechanical means. The several resultant filaments are converged into a strand, which strand is wound onto a rotating cylindrical core. The rotating core also usually comprises the attenuating means by which the exudations are attenuated into filaments.

One of the problems encountered in continuously winding controlled amounts of filaments onto winding cores or tubes is that of transferring the strand being wound from one core to another without interruption of the winding operation. It will be readily apparent that the practice of stopping the rotation of the winding spindle when the desired amount of strand has been wound, removing the completed package, and substituting an empty core results in an interruption of strand production and that such interruption entails considerable work in resuming operation and represents considerable loss in time and cost.

It has been suggested heretofore to provide a pair of winding spindles in end-to-end facing relationship, with tubes forming cores mounted thereon in a manner whereby the spindle terminal portions are exposed, and simultaneously shifting both spindles when a complete package is wound on a tube of one of the spindles to transfer the strand, after the empty tube is brought up to exactly the same rotating speed as the full tube, to the empty tube of the other spindle, i.e., the carriages supporting the spindles are shifted to effect the strand transfer from one tube to the other. Frictional engagement means are provided in such arrangements to attempt to obtain positive uniform speed between the collets before effecting transfer of the strand from one tube to another. A disadvantage of such arrangements is that the strand being wound must traverse the gap between the mutually abutting ends of the winding spindles. When the strand moves across the gap, more frequently than not, it breaks as a result of frictional engagement with the edge of one of the spindles. Furthermore, the ends of the winding spindles must be machined so that the abutting ends are perfectly matched; otherwise, the abutting spindles will chatter and tend to become misaligned.

It has also been previously suggested to provide a pair of winding spindles or arbors in end-to-end facing relationship and to displace a circular member mounted internally of one of the spindles into the space between the spindles at the time when the thread is being transferred from a filled to an empty spindle. Such an arrangement requires not only complex equipment but further complicates the synchronization of the timing. Also, in such an arrangement the relatively sharp edges of both spindles are exposed to the extent that the strand being transferred may be severed before winding is commenced on the empty spindle as the translation across the edges is attempted.

It is an object of this invention to provide an improved arrangement of winding arbors for continuously winding strand material whereby breakage of the strand during transfer from one to another of the winding arbors is virtually eliminated.

Another object of this invention is to provide method and apparatus for continuously winding strand material wherein the strand being wound is transferred from one to the other of a pair of arbors when the arbors are in coaxial and mutually facing relation but out of end-to-end engagement.

A further object is to provide an improved arrangement of a pair of winding arbors, which are coaxial and in mutually facing relation when in the strand transfer position, and wherein a straight-through air gap between the arbors is eliminated together with the attendant disadvantages.

A preferred embodiment of the apparatus of this invention is particularly adapted to operate in conjunction with glass filament producing equipment of the type from which a plurality of exudations are formed at the base of the glass melting receptacle and the exudations are attenuated and continuously advanced for convergence into one or more strands. However, it is to be understood that the method and apparatus of this invention may be employed in connection with the continuous winding of any type of strand.

In accordance with the invention, the strand is continuously wound upon winding tubes, serving as cores for the strand packages to be formed, by alternately transferring the strand from one to the other of a pair of cores supported on a pair of cantilevered and opposing winding spindles or arbors. The winding arbors are normally axially aligned with their ends in adjacent mutually facing relation but out of frictional engagement with each other. The arbors are suitably mounted upon slide members carried by a carriage so that the slide members may, with the arbors, be individually moved from an advanced or winding position to a retracted or discharge position where the filled tubes may be unloaded from the arbors and the arbors reloaded with empty tubes.

A critical feature of this invention is the relative position of the winding tubes or of the arbors so that a vertical air gap does not appear between the arbors when the arbors are in the advanced position. The essence of this phase of the invention is to position a winding tube on one of a pair of cantilevered arbors so that the tube will telescope the other arbor of the pair when the arbors are in the advanced position but out of end-to-end engagement with the tube on said other arbor. The telescoping arrangement differs from prior arrangements wherein the cantilevered arbors or spindles are in frictional engagement or wherein a disc or similar member is displaced through complex mechanism into the space between the tubes or arbors at the time the strand is transferred from a filled to an empty tube.

In order to understand the invention more fully, reference is made to the following description and accompanying drawings in which.

Figures 1, 2:
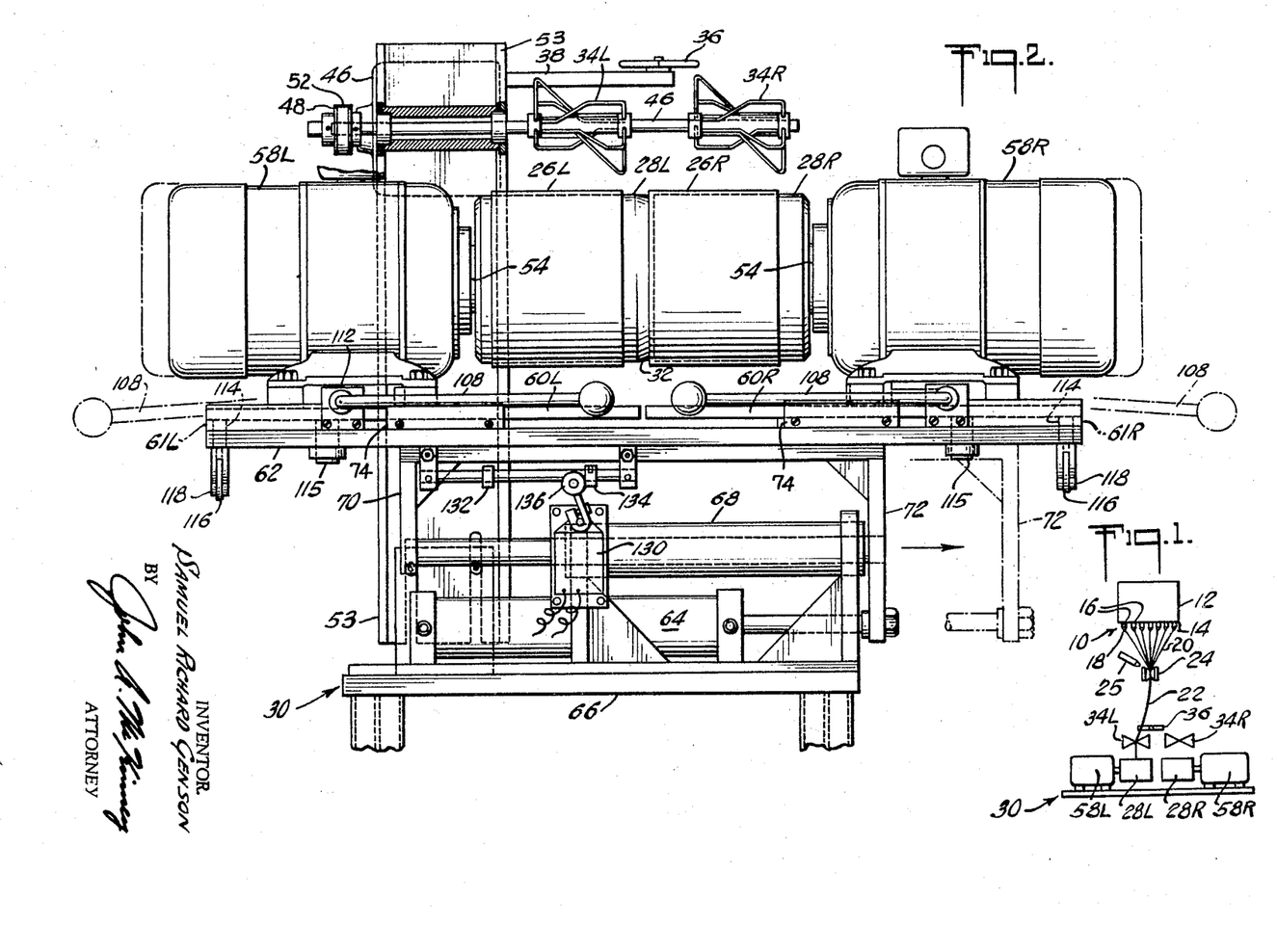
FIG. 1 is a schematic elevational view of apparatus for forming and winding glass filaments in strand form with the winding mechanism of this invention.
FIG. 2 is a front elevational view of one embodiment of the winding mechanism of this invention.
Figure 3:
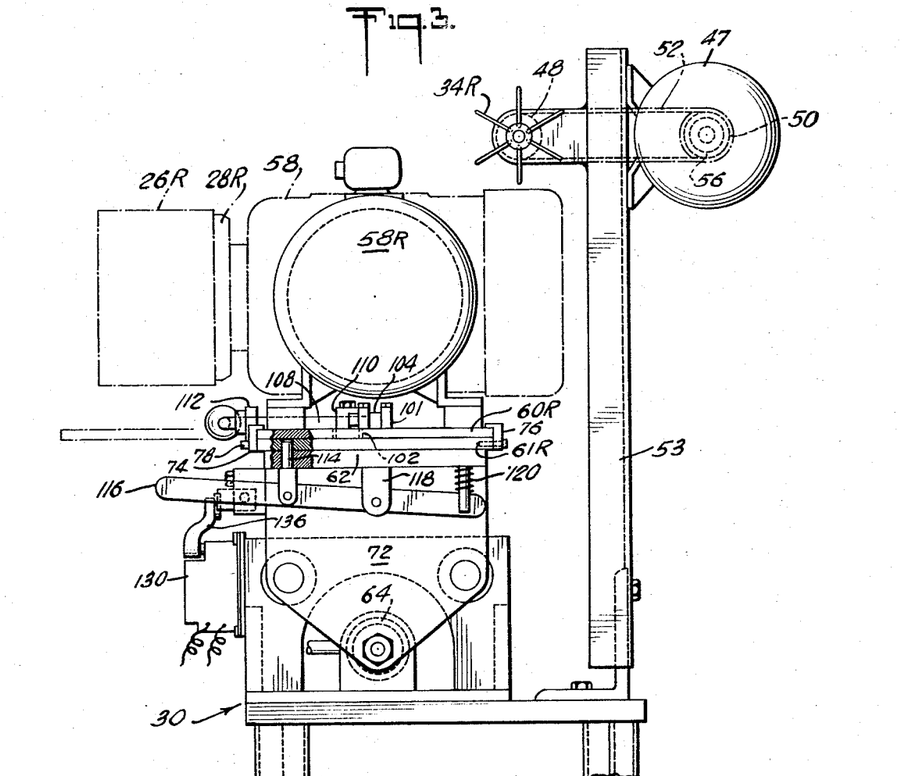
FIG. 3 is a side elevational view of the mechanism shown in FIG. 2.
Figure 4:
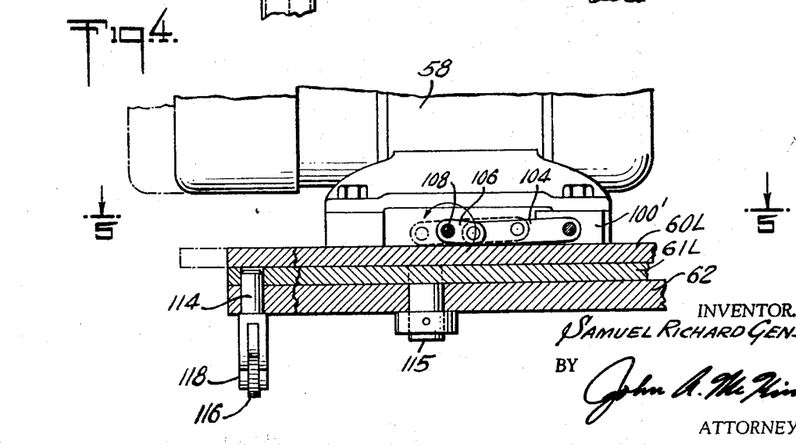
FIG. 4 is an enlarged fragmentary front elevational view of means shown in FIG. 3 for effecting translatory movement of the winding arbors to and from the advance winding position to facilitate unloading and reloading of the winding arbors with tubes.

Referring to FIG. 1, the strand source 10 there shown comprises a glass melting receptacle 12 having a bottom base portion 14 defining a plurality of apertures 16 through which molten glass is exuded to form a plurality of exudations 18 from which the several filaments 20 are attenuated. The filaments 20 are converged into a strand 22 by means of converger 24. Binder or other treating material may be applied on the filaments 20 and onto the converger 24 by nozzle 25 or other suitable means. The attenuation force is provided to the rotating tube 26 supported upon an arbor 28 of the winding machine 30 of the present invention. The winding machine 30 is particularly adapted to wind glass strands 22 upon the rotating tubes 26; however, it is to be understood that the winding machine and method of winding of this invention may be used to wind other strands.

The winding machine 30 is designed for operation in conjunction with a continuous source of strand. In FIG. 2, the winding machine 30 is shown to be provided with a pair of tubes 26R and 26L, which are carried respectively by the substantially axially aligned and cantilevered spindles or arbors 28R and 28L with their terminal portions 32L and 32R, respectively, in adjacent relation and with tube 26R telescoping spindle 28L so that strand 22 can be transferred from one tube to the other when one of the tubes becomes full without stopping the winding operation. It is to be noted that tubes 26R and 26L are not in physical contact with each other or in circumposing relation, one with the other. The advantages that accrue from this arrangement are: the terminal opposing ends of the tube 26R and 26L do not have to be machined accurately to avoid chatter; the possibility of one of the tubes mutilating the other is also avoided; and the tubes do not have to be machined to provide mating female and male portions. The provision of male and female portions would necessitate additional work on the part of the attendant operator in selecting and positioning the proper tubes on the proper arbors. It is to be further noted that the tubes 26L and 26R are axially spaced apart a relatively substantial distance, at least a distance equal to the thickness of the tubes 26, and preferably a distance sufficient to permit the strand 22, as may be seen in FIG. 13, to be wound over the edge of a tube 26R or 26L onto the surface of arbor 28L and up over the edge of an opposing tube 26L or 26R at the time the strand is transferred from one tube to the other. In any event, the tubes 26R and 26L are sufficiently spaced to prevent snagging and consequently possible breaking of the strand between the tubes 26L and 26R at the time the transfer is made.

The arbors 28R and 28L are mounted, in a manner hereinafter described in more detail, so that they, together with their corresponding tubes 26R and 26L respectively, may be retracted from the advanced position as shown by full lines in FIG. 2 to a retracted position (shown in phantom lines) where the arbors may be rotated and the filled tubes may be unloaded and the arbors reloaded with empty tubes.

Figures 12, 13:
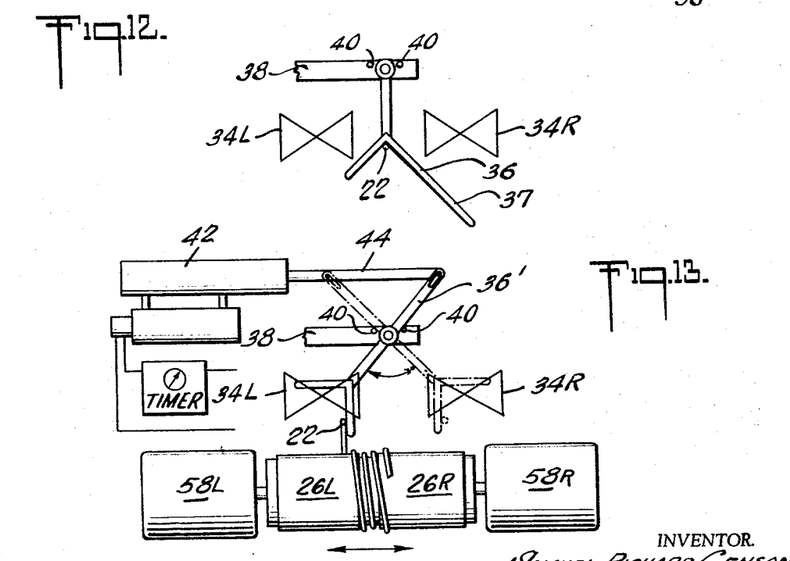
FIG. 12 is a schematic plan view of one form of guide means for transferring the strand from one arbor to another together with the primary traverse means for the respective arbors.
FIG. 13 is a schematic plan view of another form of guide means for automatically transferring the strand from one arbor to another.

The strand 22 as it advances downwardly from converger 24 is engaged by one of a pair of primary or fast traversers 34R or 34L to impart a fast translatory motion across the face of the package being formed on the winding tubes 26R and 26L. The traversers 34R and 34L may be of the form disclosed in U.S. Patent No. 3,040,999, issued June 26, 1962. In one embodiment employed, the fast traverser moves the strand approximately 3 inches along the periphery of the winding tube 26. A guide bar 36, shown to have a V-shape portion (FIGS. 12 and 13) is provided to transfer the strand 22 from one to the other of the traversers 34R and 34L when the desired package is completed on the corresponding winding tube 26. The guide bra 36 is pivotably mounted on a suitable bracket 38, which bracket may be provided with suitable stops 40 to limit the swinging movement of the bar 36 within the desired limits. The swinging movement of the bar 36 may be carried out manually by the attendant at the time a package is completed (FIG. 12) or automatically, according to a preselected timed sequence, by power means such as fluid motor 42 connected to bar 36 through linkage 44 (FIG. 13).

Traversers 34R and 34L are mounted on shaft 46 for rotational movement attained by power means shown to be in the form of motor 47, pulleys 48 and 50, and belt 52. The power means is suitably supported on stand 53 which in turn is attached to base support 66.

The supporting and driving means for arbors 28R and 28L are of similar construction, but arranged in opposite hand relation to permit the arbors 28R and 28L to be axially aligned with the terminal portions 32L and 32R in mutually facing end-to-end relation but out of frictional engagement with each other.

Figure 18:
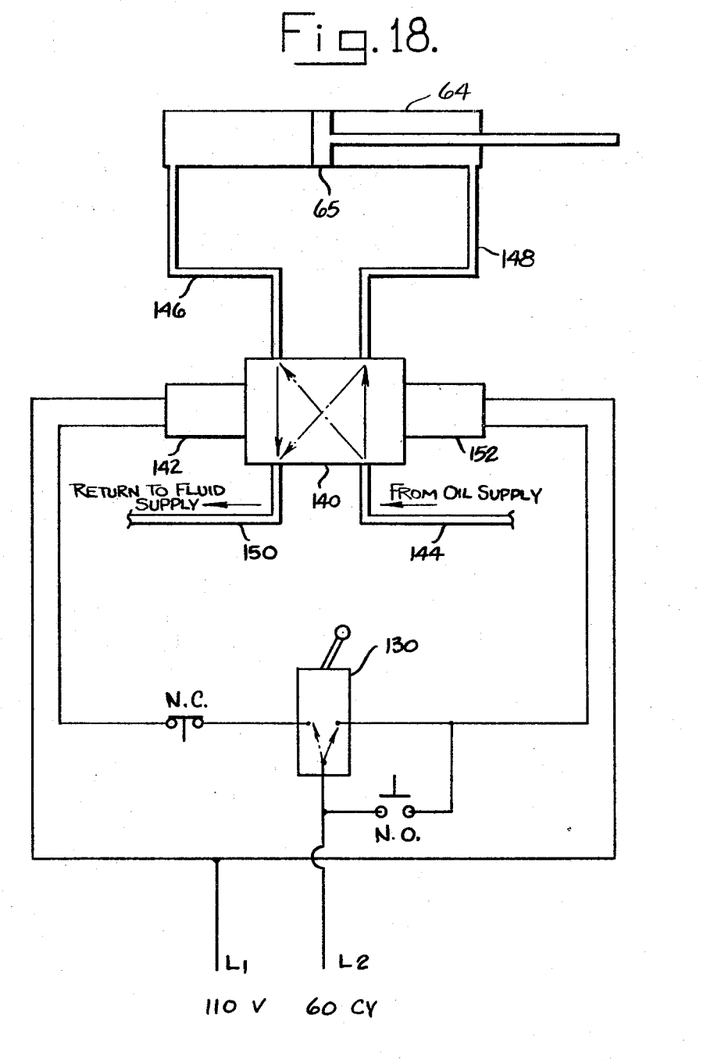
FIG. 18 is a schematic illustration of the control system for controlling the primary traverse means.

Each of the arbors 28R and 28L is shown to be supported upon a shaft 54 forming an extension of the drive shaft 56 of electric motor 58. The motor 58 is mounted on a slide member 60R or 60L carried by and supported with corresponding pivotable plate 61R or 61L for angular movement upon carriage 62. Carriage 62 is common to both slide members 60R and 60L and is reciprocated to provide a secondary traversing action to the winding tubes by means comprising fluid motor 64, mounted on base 66, and slide guide 68, attached to flange members 70 and 72 depending from and forming parts of carriage 62. Timing switch 130 and limit stops 132 and 134 are provided to automatically effect the reversal of fluid motor 64. As carriage 62 moves to the left, as viewed in FIG. 2, stop 134 engages arm 136 and trips switch 130 to start the movement of carriage 62 to the right. Carriage 62 moves to the right until stop 132 engages arm 136 and trips switch 130. The circuitry of switch 130 with motor 64 is schematically illustrated in FIG. 18. A standard four-way solenoid operated valve 140 is employed to direct the power fluid toward and away from opposite sides of the piston 65 of the fluid motor 64. As carriage 62 moves to the left and causes switch 130 to be tripped by stop 132 from the position indicated in solid lines in FIG. 18 to the alternate position shown in phantom lines, the solenoid 142 is energized and causes the valve 140 to assume a position whereby the fluid will flow from supply pipe 144 to pipe 146 and hence to the left of piston 65 and cause piston 65 to move to the right. As piston 65 moves to the right, the movement causes the fluid to the left of piston 65 to be forced through pipe 148 through valve 140 and through pipe 150. Then when stop 134 causes switch 130 to be tripped back to the normal position, the electrical circuit to solenoid 152 is closed, and the valve 140 assumes a position where the fluid from pipe 144 flows through valve 140 to pipe 148 and hence to the right side of the piston 65 to cause the piston 65 to move to the left and force fluid out of pipe 146 through valve 65 back to the supply through pipe 150.

Preferably, the fluid motor 64 drives carriage 62 with an approximate stroke of 3½ inches. The secondary traverse movement of 3½ inches coupled with a 3-inch primary traverse movement by traverse 34 will provide a total traverse or wound package of approximately 6½ inches on winding tube 26. In such arrangement, preferably the tubes 26L and 26R are axially spaced at least an inch apart.

The winding of strand 22 on a particular arbor 28R or 28L and its corresponding tube 26R or 26L takes place when the arbor is in an advance or winding position. Each of the slide members 60R and 60L is movable, along the longitudinal axis of the machine, in respect to its support, pivotable plate 61R or 61L, which support in turn is carried by carriage 62. Guides 74 and 76, suitably secured to supports 61R and 61L, may be provided to assist in guiding slides 60R and 60L during their linear movement to and away from the advance position. As shown in FIGS. 2–5, means are provided to manually facilitate the actuation of the linear movement of slides 60R and 60L to and from the advance position and the pivotal movement of arbors 28R and 28L to and from the reloading position.

Linkage 104 is journalled in yoke 101 which yoke is attached to slide 60. Linkage 104 is also pivotably connected to arm 106 of crank 108. Crank 108 is journalled in bearing block 110 which block extends through opening 102 of slide 60 and is secured to support 61. As may be seen in FIG. 5, counterclockwise rotation of handle 112 will cause slide 60L to be retracted from the advance position there shown in full lines to the retracted position shown in phantom lines.

Figure 5:
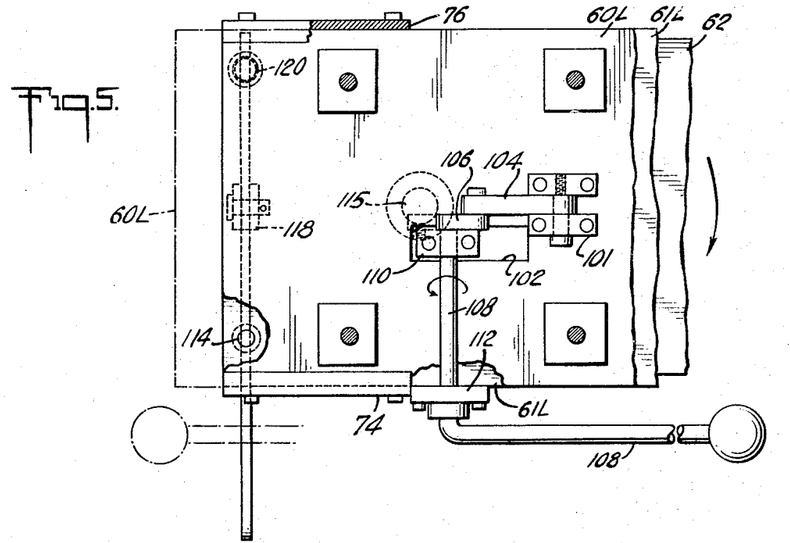
FIG. 5 is a cross-sectional plan view taken along lines 5—5 of FIG. 4.

After the slide 60 is retracted, the arbor 28L may be rotated to the unloading and reloading position by releasing lock pin 114 and pivoting plate 61 about pivot 115 supported in carriage 62. Lock pin 114 is attached to actuating lever 116 which lever is supported in bracket 118. Spring retention means 120 is also attached to lever 116 to overcome gravitational forces and retain pin 114 in the locked position.

Figure 11:
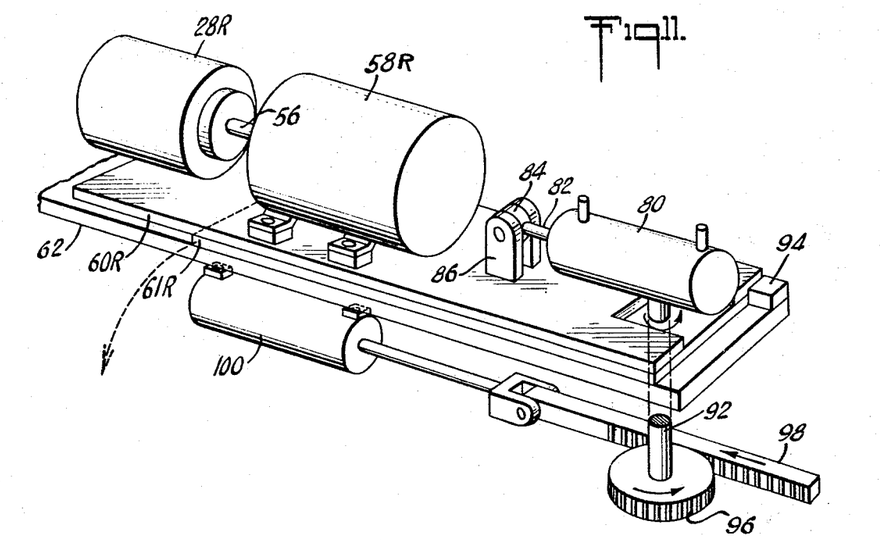
FIG. 11 is a schematic pictorial view of alternate means to that shown in FIG. 4 for effecting the translatory movement of the arbors.

For automatically reciprocating the slide member 60R to and from the advance position from and to the retracted position, a fluid motor 80 may be optionally provided as shown in FIG. 11. A corresponding motor 80 and appurtenances may be provided to operate slide 60L in the same manner as slide 60R is operated. The fluid motor 80 is mounted on slide 60R to rotate in unison therewith. The piston arm 82 of fluid motor 80 is connected to upstanding yoke 86 of slide member 60R through journal 84. The slide 60R is adapted to move in a linear path relative to plate 61R and carriage 62 to facilitate loading and unloading of the corresponding arbor 28R.

Pivot member 92 extending through carriage 62 together with plate 61R provide a pivotal support for fluid motor 80. Rotation of pivot member 92 is effected through pinion gear 96 and rack 98, driven by fluid motor 100, which motor is carried by carriage 62.

When slide 60R is in the retracted position, rotation of pivot 92 and consequently plate 61R causes slide 60R to rotate in a horizontal plane to a position substantially normal to the linear movement and alignment axis of arbors 28R and 28L. Stop member 94 may be provided to arrest and limit the angular path of plate 61R as it is rotated.

Figure 14:
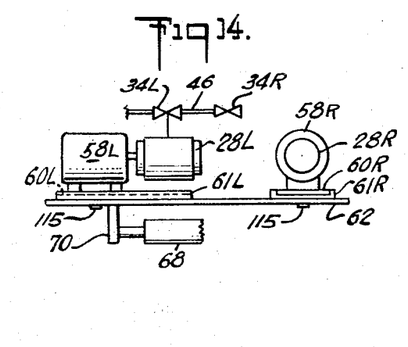
FIG. 14 is a schematic front elevational view of the winding mechanism with one of the arbors in the reload position.
Figure 15:
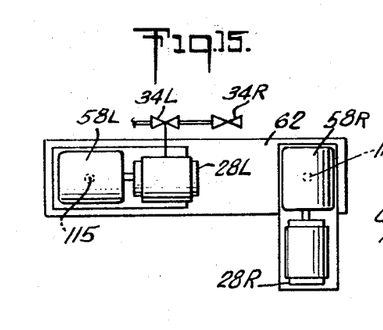
FIG. 15 is a schematic plan view of the mechanism shown in FIG. 14.
Figure 16:
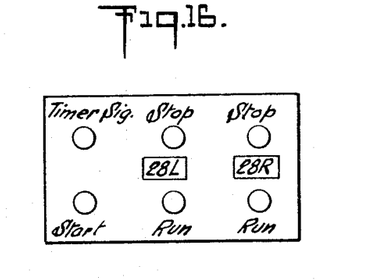
FIG. 16 is a view of the panel of control buttons for operating the winding mechanism.

The operational procedure whereby the winding tubes are wound semi-automatically by the apparatus illustrated in FIGS. 2–5 and 12 may be summarized as follows:

(1) Arbor 28L is in an advance winding position and 28R is retracted and rotated 90°, start button (FIG. 14) is actuated to power the winding mechanism, winding of the strand is started on the arbor 28L;

(2) The arbor 28L run button is actuated to automatically start rotation of the traverse motor 46 and reciprocation of fluid motor 64;

(3) The timer signal is actuated;

(4) After loading arbor 28R, it is rotated and advanced and run button for arbor 28R is actuated;

(5) When the signal light comes on, the operator transfers the strand to arbor 28R and reactuates the signal button;

(6) The stop button for arbor 28L is then depressed, arbor 28L is retracted, rotated, the full tube is unloaded, a new tube is loaded;

(7) Arbor 28L is rotated and advanced forward and run button for arbor 28L is actuated;

(8) The above-described operation is then alternately repeated for each of the arbors.

It will be apparent that the operation may be made fully automatic by providing the proper controls in the circuit to effect the retraction of the arbors 28 by means as described in connection with FIG. 11 and to stop the rotation of the respective arbors upon withdrawal from their winding positions, and by incorporating automatic strand transfer means, such as illustrated in FIG. 13, to transfer the strand from one arbor to the other upon completion of the desired package.

Figure 17:
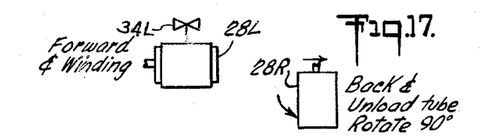
FIGS. 17–17i are schematic plan views illustrating the operational sequence of the winding mechanism.

The operation of the winding mechanism 30 during a complete cycle will now be described more fully with reference to FIGS. 17–17i. In FIG. 17 the strand 22 is positioned over traverse 34L for winding on arbor 28L. Arbor 28R is in a retracted position and rotated out of axial alignment with arbor 28L, ready for loading with an empty winding tube 26. As the strand 22 is being wound onto 26L on arbor 28L, the carriage moves relatively slowly to superimpose a slow or secondary traverse upon the fast or primary traverse effected by traverse 34 and thus increases the span of the total traverse.

Figure 17A:
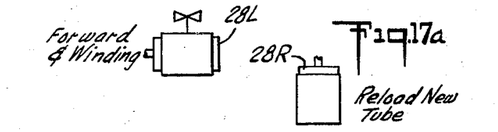
Figure 17B:
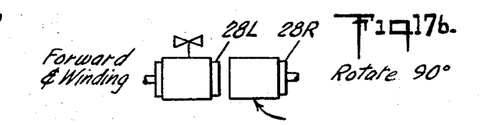
Figure 17C:
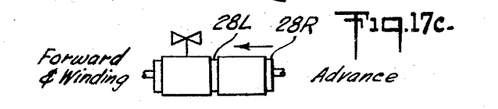

During this time the attendant operator loads an empty tube 26 upon arbor 28R so that tube 26 extends slightly beyond the terminal end 32R (FIG. 17a). Plate 61R and slide 60R are rotated to bring arbor 28R into axial alignment with arbor 28L. Power is then furnished to electric motor 58R to start the rotation of arbor 28R (FIG. 17b). Slide 60R is then advanced sufficiently to place tube 26R into telescoping relation with the terminal portion 32L of arbor 28L (FIG. 17c) but out of contact with tube 26L.

Figure 17D:
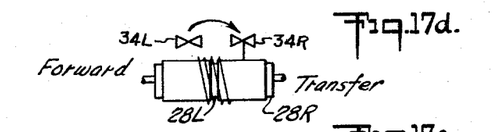

As the strand 22 is advanced to the right of tube 26L and the desired package is built up upon tube 26L, the strand 22 is transferred from tube 26L onto arbor 28L and then onto tube 26R by the rotation of guide bar 36 (FIG. 17d). The rotation of guide bar 36 may be conducted according to a time sequence by providing suitable electrical controls to actuate fluid motor 42 connected to guide bar 36. Optionally, the guide bar may be rotated manually. In such case, one leg 37 of the guide bar 36 may be extended to provide a gripping surface for the operator.

Figures 17E, 17F:
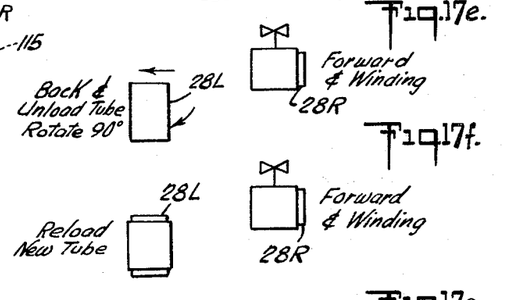
Figures 17G, 17H:
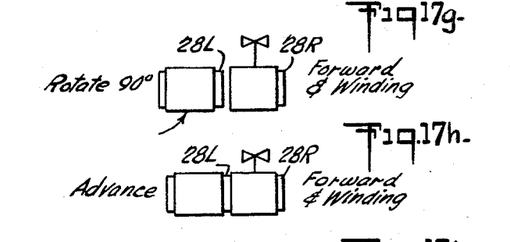
Figure 17I:
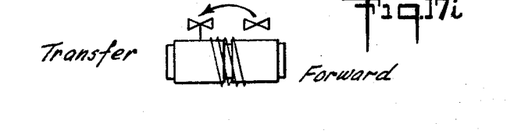

As the winding of strand 22 is commenced on winding tube 26R, arbor 28L is withdrawn to a retracted position and rotated out of axial alignment with arbor 28R (FIG. 17e) to facilitate unloading of the completed tube 26L (FIG. 17e) and reloading with an empty winding tube 26 (FIG. 17f). After the arbor 28L is reloaded with an empty tube 26, the arbor 28L is then rotated into axial alignment with arbor 28R (FIG. 17g) and advanced to the advance position wherein the arbor 28L is telescoped by the winding tube 26R mounted on arbor 28R (FIG. 17h).

Upon completion of the package on tube 26R the strand is transferred from tube 26L onto arbor 28L and then onto tube 26L (FIG. 17i) in the manner as previously described in transferring from tube 26L to tube 26R. After the strand 22 is transferred to tube 26L, arbor 28R is retracted and rotated out of axial alignment with arbor 28L to expose the end of the arbor 28R so that it may be unloaded and reloaded with an empty tube.

At this stage of the operation the sequence corresponds to that as described at the beginning of the cycle and the cycle is therefore accordingly repeated as often as desired and so long as the supply of strand is continuously furnished.

Figure 6:
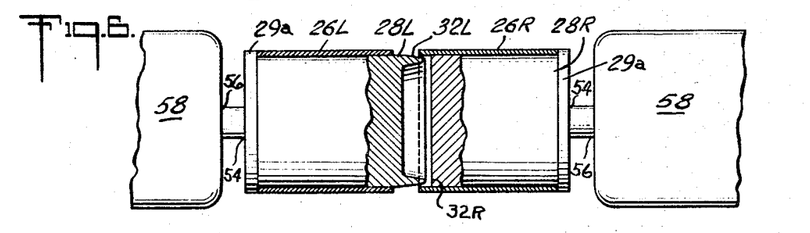
FIG. 6 is a view illustrating a preferred arrangement of winding arbors and tubes at the time strand is transferred.
Figure 7:
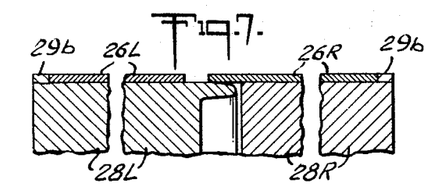
FIGS. 7–10 are views representing alternate embodiments of the arrangement shown in FIG. 6.
Figure 8:
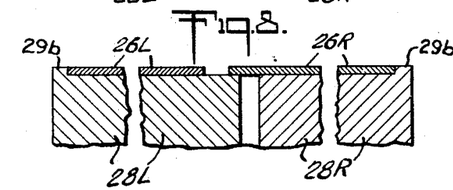
Figure 9:
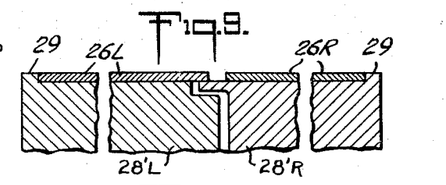

As will be readily apparent an extremely simple expedient has been provided in this invention for facilitating the transfer of strand from one winding arbor or mandrel to another to permit continuous operation without danger of breaking the strand or without any interruption. One of the principal features of this invention is the concept of mounting the winding tubes upon the arbors in a manner whereby the tube on one arbor will telescope the opposing arbor as illustrated in FIGS. 6–9 so as to provide a continuous surface upon which the strand may be wound. Stop means 29 may be provided to facilitate accurate positioning of the tubes 26 upon the arbors 28. Such stop means may be in the form of additional tubes 29a which remain on the arbors 28 as is shown in FIG. 6. Such stop means may also be embossments 29b formed on the arbors as by welding rings (FIG. 7) onto or undercutting the surfaces of arbors 28 (FIGS. 8–10).

An alternative embodiment is disclosed in FIG. 9. In FIG. 9, one of the arbors 28 has been modified in the form of 28'R to provide a terminal portion which when the arbors 28 are adjacent to each other and in axial alignment, the terminal portion of 28'R will telescope the terminal portion of arbor 28'L. The terminal portion of 28'L is sufficiently undercut to provide a diameter sufficiently less than the diameter of the telescoping terminal portion of arbor 28'R to avoid frictional engagement therewith.

Figure 10:
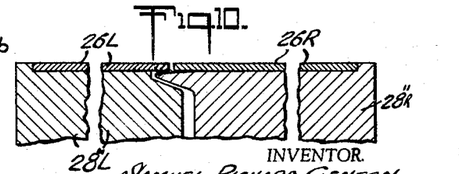

Another modification that may be employed without departing from the scope of this invention is illustrated in FIG. 10. In FIG. 10 the terminal portion of arbor 28"L is undercut to facilitate insertion within the overlying portion of tube 26R and to avoid interference therewith in the event that the tube 26 mounted on arbor 28"R is deformed or mutilated for any reason.

Although the machine has been described in regard to the carriage as being common to both slide members 60R and 60L, it will be apparent that a separate carriage 62 may be provided for each of the slide members together with a separate fluid motor 64 so long as proper controls are also provided to synchronize the operations thereof.

It will be further apparent that a single primary traverse may be employed to traverse the strand across the face of each of a pair of winding arbors and that the strand may be transferred from one to the other of the arbors by indexing such single traverse into positions adjacent each arbor.

While the machine has also been described in detail as to other component parts, it will be understood that such detail is for the purpose of illustration and not by way of limitation. The appended claims are therefore intended to cover any such modifications coming within the true scope of the invention.

What I claim is:

1. The method of continuously winding a continuous strand, comprising: winding the strand on a winding tube mounted on a first arbor; positioning a second arbor, mounting a winding tube, adjacent to but out of frictional engagement with said first arbor, and with one of the winding tubes being in telescoping relation with at least a portion of both the first and the second arbors but in axial spaced relation with the other of said winding tubes; transferring the strand from said winding tube on said first arbor onto the surface of one of said first and second arbors and then onto said winding tube on said second arbor while said one of said winding tubes is in said telescoping relation.

2. The method of continuously winding a continuous strand, comprising: positioning a first empty winding tube on a first rotatable and cantilevered arbor with the terminal portion of said tube adjacent the free hanging end of said first cantilevered arbor being spaced therefrom along the axis of rotation of but being fully supported by said arbor; positioning a second empty winding tube on a second rotatable and cantilevered arbor with a terminal portion of said second tube adjacent the free hanging end of said second cantilevered arbor being spaced therefrom and unsupported thereby; winding said strand on one of said tubes; while winding said strand on said one of said tubes, positioning said first and second arbors and tubes in a relation wherein said second tube telescopes said first arbor and is in axial spaced relation with said first tube; and transferring said strand from the tube upon which it is being wound to said first arbor and then onto the other of said tubes when said second tube is in telescoping position with said first arbor.

3. Apparatus for winding strand material continuously presented at a winding station, comprising: a pair of rotatable winding arbors having a common winding axis; a winding tube on each of said arbors; and carriage means separately mounting each of said arbors for movement toward each other to an advanced position and in opposed relation, but out of frictional engagement, and for movement away from each other to a retracted position, said tube on one of said arbors overlapping the other arbor of said pair when said arbors are in said advanced position but being in axial spaced relation, a distance greater than the thickness of one of said tubes, and out of contact with the other of said tubes.

4. Apparatus as described in claim 3 which further comprises: means to effect the transfer of said strand material from one to the other of said tubes when said arbors are in the advanced position, and wherein said tubes are axially spaced sufficiently so that the strand is intermediately transferred onto the overlapped arbor when said transfer from one to the other of said tubes is made.

5. Apparatus for winding continuous strand, comprising: a pair of rotatable winding arbors; carriage means mounting each of said arbors for movement along a common axis toward each other to an advanced position and in opposed but spaced relation and for movement away from each other to a retracted position; a tubular element telescoping each of said arbors when in said advanced position; a winding tube on at least one of said arbors, said tubular element being axially spaced from said winding tube when said arbors are in said advanced position; means for transferring the strand across said tubular element and onto said winding tube, the axial spacing between said tubular element and said winding tube being sufficient so that said strand is intermediately wound on the arbor supporting said winding tube when said strand is transferred from said tubular element and on to said winding tube.

6. Apparatus for winding an infinitely continuous strand including a source for supplying said strand, comprising a pair of rotatable winding arbors; means for rotating said arbors; a winding tube on each of said arbors; one of said tubes being positioned to overhang the terminal portion of its respective arbor and to telescope the other of said arbors when said arbors are in an advanced position but being in axial spaced relation with the other of said tubes; carriage means independently mounting each of said arbors for advance movement toward each other to an advanced position and for movement away from each other to a retracted position, said advance movement being along a common axis parallel to the axis of rotation of said arbors; secondary traversing means commonly mounting said carriage means for moving said arbors along said common axis to effect movement of said strand along the peripheries of said tubes; primary traversing means for each of said arbors and being positioned along the advancing path of said strand between said source and the respective winding arbor for moving said strand in a series of cycles including a progressive and regression motion across the periphery of the respective winding tube; and transfer means for transferring the strand from one of said primary traversing means to the other when said arbors are in the advance position.

7. Apparatus as described in claim 6 including means for operating said transfer means upon completion of a preselected winding time cycle.

8. Apparatus as described in claim 6 wherein one of said arbors of said pair and one of said winding tubes telescopes the other arbor of said pair when said arbors are in said advanced position.

9. Apparatus for winding an infinitely continuous strand upon the periphery of a cylindrical support including a source for supplying said strand, comprising: a base; a pair of arbors mounted upon said base for advance movement along a common axis toward each other to an advanced position, a winding tube on each of said arbors, at least a portion of one of said tubes on one of said arbors being in telescoping relation with at least a portion of the other of said arbors when in said advanced position but being in axial spaced relation with the other of said tubes; means for advancing said arbors to said advanced position and for retracting said arbors to a retracted position; secondary traversing means for moving said arbors along said axis to effect movement of said strand along the peripheries of said tubes; primary traversing means for each of said arbors for moving said strand in a series of cycles including a progressive and regressive motion across the periphery of each tube; means for transferring the strand from one to the other of said primary traversing means when said arbors are in the advanced position; and means for individually pivoting each of said arbors, when in the retracted position for loading and unloading thereof.

References Cited by the Examiner

UNITED STATES PATENTS

| 2,296,339 | 9/1942 | Daniels | 242—19 |
| 2,622,810 | 12/1952 | Stream et al. | 242—18 |
| 2,932,461 | 4/1960 | Kimberly | 242—18 |
| 3,041,662 | 7/1962 | Cochran | 242—18 X |
| 3,041,663 | 7/1962 | Green | 242—18 X |

FOREIGN PATENTS 882,128   11/1961   Great Britain.

STANLEY N. GILREATH, *Primary Examiner.*